United States Patent
Chaudhari et al.

(10) Patent No.: US 10,387,993 B2
(45) Date of Patent: Aug. 20, 2019

(54) FAULT-TOLERANT GRAPHICS DISPLAY ENGINE

(71) Applicant: Intel Corporation, Santa Clara, CA (US)

(72) Inventors: Prashant D. Chaudhari, Folsom, CA (US); Michael N. Derr, El Dorado Hills, CA (US); Arthur J. Runyan, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/721,273

(22) Filed: Sep. 29, 2017

(65) Prior Publication Data

US 2019/0102861 A1 Apr. 4, 2019

(51) Int. Cl.
*G06T 1/60* (2006.01)
*G09G 5/395* (2006.01)

(52) U.S. Cl.
CPC .............. *G06T 1/60* (2013.01); *G09G 5/395* (2013.01); *G09G 2320/0257* (2013.01); *G09G 2330/026* (2013.01); *G09G 2330/08* (2013.01); *G09G 2330/12* (2013.01); *G09G 2354/00* (2013.01); *G09G 2360/127* (2013.01); *G09G 2360/18* (2013.01); *G09G 2380/10* (2013.01)

(58) Field of Classification Search
CPC ......... G06T 1/60; G09G 2350/00; G06F 5/06; G06F 9/5016; G06F 2212/1024; G06F 3/0656

See application file for complete search history.

(56) References Cited

U.S. PATENT DOCUMENTS

| 8,751,881 | B1 | 6/2014 | Terry et al. | |
|---|---|---|---|---|
| 2002/0016850 | A1* | 2/2002 | Fritz | G06F 5/06 709/232 |
| 2005/0180250 | A1* | 8/2005 | Suzzoni | G06F 5/06 365/230.05 |
| 2009/0262749 | A1 | 10/2009 | Graumann et al. | |

(Continued)

FOREIGN PATENT DOCUMENTS

WO WO-2012093283 A1 7/2012

OTHER PUBLICATIONS

"International Application Serial No. PCT/US2018/051487, International Search Report dated Dec. 26, 2018", 3 pgs.

(Continued)

*Primary Examiner* — Hau H Nguyen
(74) *Attorney, Agent, or Firm* — Schwegman Lundberg & Woessner, P.A.

(57) ABSTRACT

Various techniques for providing a fault-tolerant graphics display engine are disclosed herein. In an example, a machine identifies a buffer under-run at a data buffer (DBUF) of a display engine. The machine adjusts a latency tolerance of the DBUF in response to identifying the buffer under-run. The machine determines that the buffer under-run at the DBUF persists after adjusting the latency tolerance. The machine determines whether a preset correction limit has been reached. If the preset correction limit has not been reached, the machine further adjusts the latency tolerance of the DBUF. If the preset correction limit has been reached, the machine removes, from a visual output associated with the display engine, one or more non-critical display assets.

25 Claims, 5 Drawing Sheets (56) References Cited

U.S. PATENT DOCUMENTS

| | | | |
|---|---|---|---|
| 2010/0073388 A1 | 3/2010 | Mostinski et al. | |
| 2013/0257687 A1* | 10/2013 | Chun | G06F 3/14 345/2.3 |
| 2014/0189771 A1 | 7/2014 | Park et al. | |
| 2015/0161759 A1* | 6/2015 | Staudenmaier | G09G 3/20 345/531 |
| 2017/0063959 A1* | 3/2017 | Roncero Izquierdo | H04L 65/607 |

OTHER PUBLICATIONS

"International Application Serial No. PCT/US2018/051487, Written Opinion dated Dec. 26, 2018", 5 pgs.

* cited by examiner

FAULT-TOLERANT GRAPHICS DISPLAY ENGINE

TECHNICAL FIELD

Embodiments described herein generally relate to operation of a display engine of an electronic device. Some embodiments described herein generally relate to a fault-tolerant graphics display engine.

BACKGROUND

Buffer under-run is a state occurring when a buffer used to communicate between two devices or processes is fed with data at a lower speed than the data is being read from it. Display engine buffer under-run can cause content corruption or unreadability of visual data delivered to a display panel. Thus, techniques for reducing or mitigating for the occurrence of buffer under-run may be desirable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, device components, and related apparatuses are disclosed that provide a fault-tolerant graphics display engine for functional safety. Specifically, the following description includes various examples of fault-tolerant graphics display engine hardware and software.

In an example, the technology described herein provides fault-tolerant graphics display engine hardware for functional safety. The technology described herein may be implemented in any graphics processing environment, for example, a vehicle control display in an autonomous or human-controlled vehicle (e.g. surface vehicle, air vehicle, space vehicle, under/ over water vehicle, or under/ over ground vehicle). The technology described herein may also be useful in, among other areas, industrial robotics, and medical device/ equipment manufacture and usage.

In an example, a computer system identifies a buffer under-run at a data buffer (DBUF) of a display engine of the computer system. The computer system adjusts a latency tolerance of the DBUF in response to identifying the buffer under-run. The computer system determines that the buffer under-run at the DBUF persists after adjusting the latency tolerance. The computer system determines whether a preset correction limit has been reached. If the preset correction limit has not been reached, the computer system further adjusts the latency tolerance of the DBUF. If the preset correction limit has been reached, the computer system removes, from a visual output associated with the display engine, one or more non-critical display assets. As used herein, the term "engine" encompasses its plain and ordinary meaning and may include a component of a computing device including processing hardware and/or memory for carrying out operations. As used herein, the phrase "display engine" encompasses its plain and ordinary meaning and may include a component of a computing device including processing hardware and/or memory for carrying out operations related to a display panel.

Figure 1:
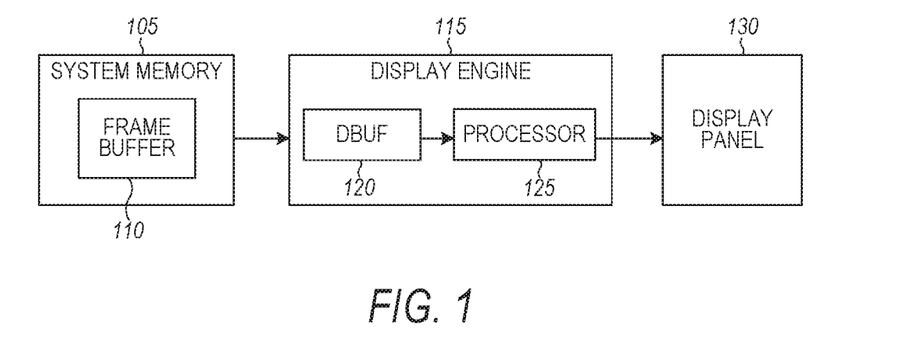
FIG. 1 illustrates a system in which a fault-tolerant graphics display engine may be implemented, according to an example.

FIG. 1 illustrates a system 100 in which a fault-tolerant graphics display engine may be implemented, according to an example. As shown, the system 100 includes a system memory 105, a display engine 115, and a display panel 130.

The system memory 105 includes a frame buffer 110. The frame buffer 110 is stored within the system memory 105. The frame buffer 110 stores frames to be provided to the display engine 115. The frame buffer 110 (or another part of the system memory 105) provides data to be displayed to the display engine 115.

The display engine 115 may be implemented in hardware, software, or a combination of software and hardware. A hardware version of the display engine may include video card(s) or graphics card(s). A software version of the display engine may include a client application that decodes video/ graphics. In some examples, the display engine includes both video/ graphics card(s) and the client application that decodes video/graphics. As shown, the display engine 115 includes a DBUF 120 and a processor 125. Data from the system memory 105 and frame buffer 110 is buffered at the DBUF 120 and eventually provided to the processor 125. The processor 125 then outputs the data to the display panel 130. The display panel 130 provides a visual display of the data to the user. A visual output associated with the display engine 115 is provided for display at the display panel 130. The display panel 130 may include one or more of a monitor, a screen, a touchscreen, or the like.

During buffer under-run, data exits the DBUF 120 (to the processor 125) at a faster rate than data enters the DBUF 120 (from the system memory 105). Data enters the DBUF 120 at a slower rate than data exits the DBUF (to the process 125). As a result, the DBUF 120 may become empty. The DBUF 120 becoming empty prevents the processor 125 from receiving data from the DBUF 120. This may cause the processor 125 to fail or to provide corrupt or unreliable data to the display panel 130.

In some cases, visual data for display is transmitted to the DBUF 120 from the frame buffer 110. The DBUF 120 stores the visual data. The DBUF 120 transmits the visual data to the display panel 130 or an intermediate buffer (e.g. processor 125) coupled with processing hardware of the display panel 130. When the DBUF 120 transmits the visual data, the visual data may be removed from the DBUF 120. Eventually, the visual data is provided to the display panel 130 and displayed at the display panel 130. The frame buffer 110 and the system memory 105 may reside at the same machine as the display engine 115. Alternatively, the system memory 105 (which stores the frame buffer 110) may be a remote memory, external to a machine housing the display engine 115, and connected to that machine via a wired, wireless, or network connection. In some examples, the frame buffer 110 is stored throughout a volatile or non-volatile memory/storage hierarchy.

As noted above, display engine buffer under-run may cause content corruption or unreadability (to the user) of an intended visual delivery. Such visual artifacts are dangerous for the functional safety and reliability of mission critical systems, such as autonomous or human-controlled vehicles (e.g. surface vehicle, air vehicle, space vehicle, under/over water vehicle, or under/over ground vehicle) and other technology spaces, such as industrial robotics, and medical device/equipment manufacture and usage. The under-runs may manifest in such vehicles/systems due to component characteristic variations caused by changes in atmospheric conditions (e.g. temperature, humidity, radiation, physical movement, etc.), material or component degradation, manufacturing faults, security breach of software or microcontrollers, or other reasons. Under-run may occur despite proper configuration at system startup initialization. In some cases, there might not be a scheme for automatically overcoming under-run once it occurs. The user may have to rely on debugging or on manual trial-and-error hardware system reconfiguration.

Some aspects of the technology described herein use hardware mechanisms to adjust the latency tolerance of the display engine buffer. For example, the minimum buffer data level to maintain may be adjusted once the under-run is detected at system run time. Some aspects of the subject technology incorporate the programmable history mechanism of previous automatic hardware correction steps for non-correctable errors. Some aspects of the subject technology include injection of a fatal error message for system logging or diagnostics. As used herein, the phrase "latency tolerance" encompasses its plain and ordinary meaning. A buffer may be more latency tolerant if it can withstand greater delays in data being written to the buffer, while data is being read from the buffer.

In some cases, upon display engine buffer under-run, the user notices visual artifacts on the display. The user may then perform manual debug or report issues to the manufacturer to overcome the failures. Some aspects of the technology described herein provide automatic solutions to display engine buffer under-run, such that the user does not need to rely on manual debugging or reporting issues to the manufacturer. The visual artifacts on the display may be either transient or permanent. In some cases, the artifacts may not be noticed by the user due total loss of information or user not being aware of such information capability. In some cases, critical information may be lost, further potentially causing harm to user due to lack of information (or misinformation) leading to a wrong judgement or decision by the user. This may be caused by, for example, permanent clipping of the bottom part of display on a black screen without any flickering artifacts caused by the under-run. This case may, in some examples, not give an opportunity to the user to initiate a preliminary manual debug.

Figure 2:
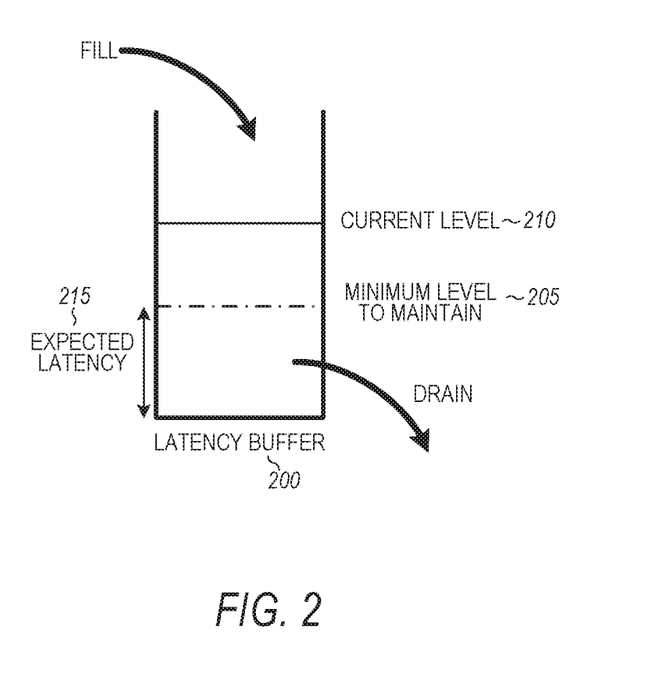
FIG. 2 illustrates a latency buffer, according to an example.

FIG. 2 illustrates a latency buffer 200, according to an example. The latency buffer 200 may correspond to the DBUF 120 of FIG. 1. As shown, the latency buffer 200 is filled with data from a source (e.g. the system memory 105) and drains data to a sink (e.g. the processor 125). The latency buffer 200 is designed or programmed to maintain a minimum level of data at all time (for data provision to the sink). This minimum level of data is identified by the minimum level to maintain 205 of the latency buffer 200, which corresponds to the expected latency 215 of the latency buffer. As shown, the current level 210 of data in the latency buffer 200 is above (greater than) the minimum level (of data in the latency buffer 200) to maintain 205.

Figure 3:
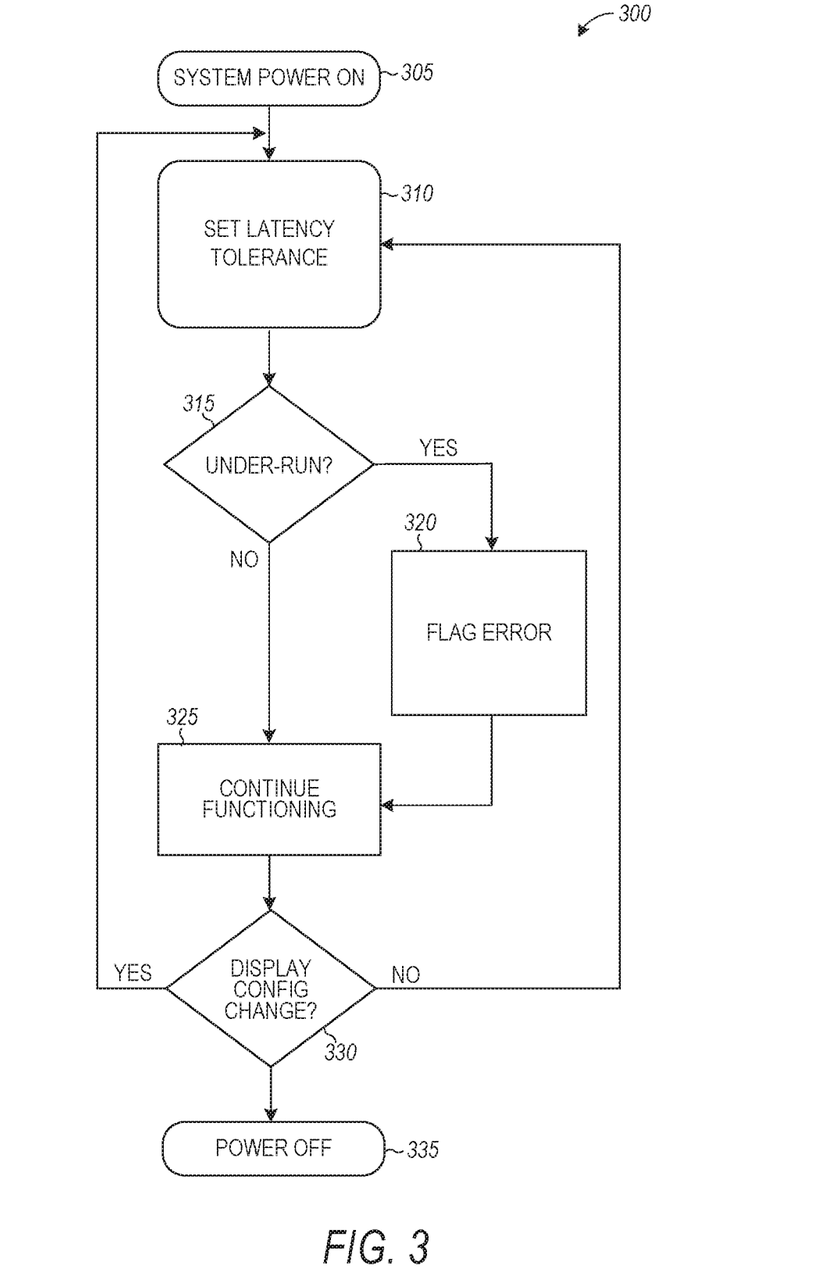
FIG. 3 illustrates a flowchart of a first method for identifying and responding to a buffer under-run, according to an example.

FIG. 3 illustrates a flowchart of a first method 300 for identifying and responding to a buffer under-run, according to an example.

At operation 305, a computing machine (e.g. which includes the system 100 of FIG. 1) is powered on. At operation 310, a latency tolerance for the computing machine is set. Operation 310 may take place during booting of the computing machine. At operation 315, the computing machine determines whether display engine buffer under-run of the DBUF 120 is detected. If so, the method 300 continues to operation 320. If not, the method 300 continues to operation 325 (skipping operation 320).

At operation 320, the buffer under-run error is flagged. After operation 320, the method 300 continues to operation 325. In some cases, flagging is not enabled, and operation 320 is skipped even if there is a buffer under-run.

At operation 325, after the buffer under-run error is flagged or if there is no buffer under-non, the computing machine continues functioning. At operation 330, the computing machine determines whether there is a display configuration ("config") change. If so, the method 300 returns to operation 310. If not, the method 300 returns to operation 315. At some point, at operation 335, the computing machine is powered off.

As described in conjunction with FIG. 3, on some hardware, the latency tolerance for the DBUF 120 of the display engine 115 (e.g. the minimum level to maintain 205) is set according to the detected configuration during the booting process of the computing machine. Once the computing machine is booted, during normal operation, if under-run occurs, the display engine 115 continues its normal flow of operations. If error logging or reporting is implemented, errors will be logged or reported. If the display configuration changes, then a new latency tolerance may be set. However, the behavior upon buffer under-run may stay the same. Thus, the user viewing the display panel 130 may not have the intended visual experience when under-run happens.

Figure 4:
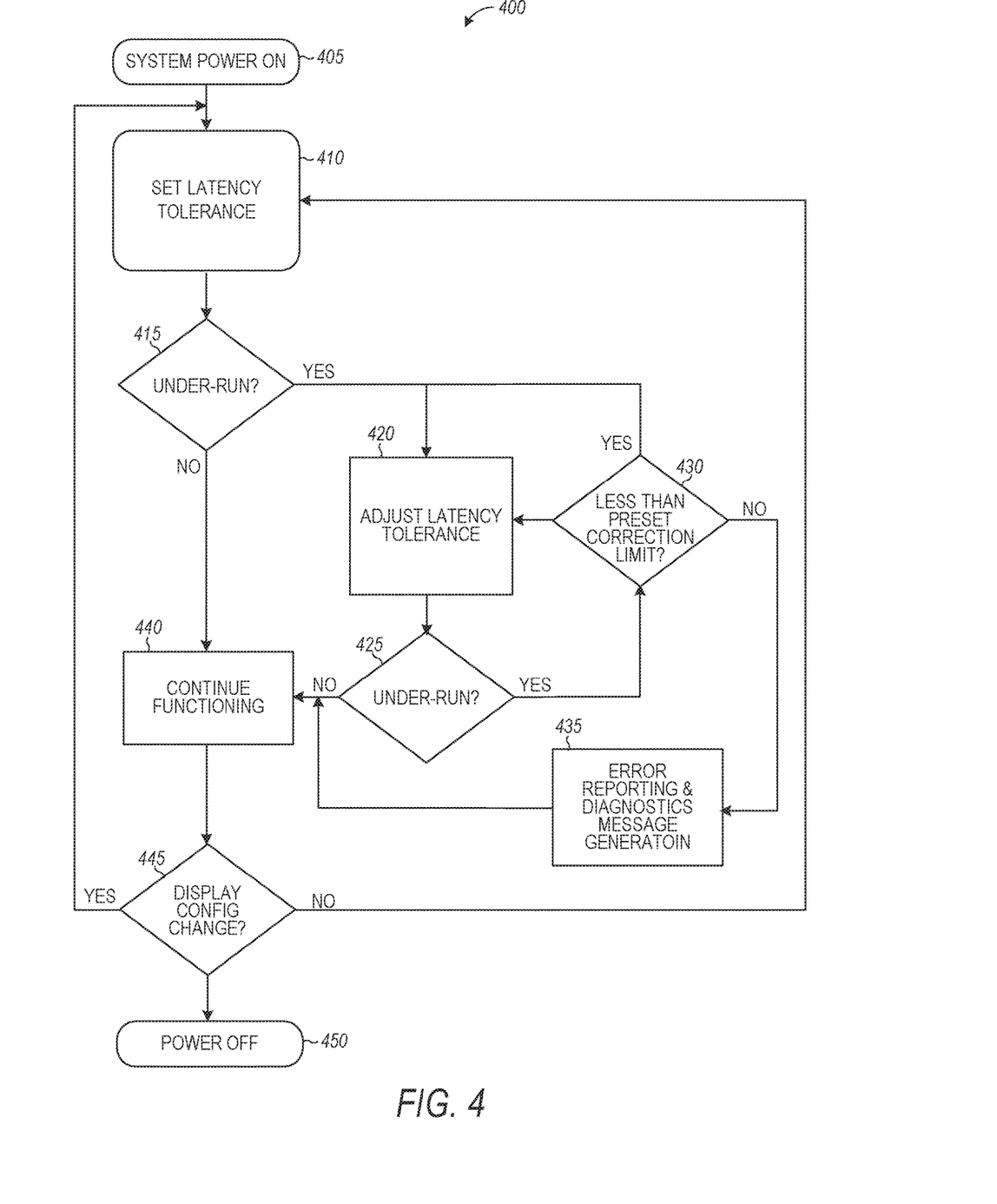
FIG. 4 illustrates a flowchart of a second method for identifying and responding to a buffer under-run, according to an example.

FIG. 4 illustrates a flowchart of a second method 400 for identifying and responding to a buffer under-run, according to an example.

At operation 405, a computing machine (e.g. which includes the system 100 of FIG. 1) is powered on. At operation 410, a latency tolerance for the computing machine is set. Operation 410 may take place during booting of the computing machine. At operation 415, the computing machine determines whether display engine buffer under-run of the DBUF 120 is detected. Buffer under-run is a state occurring when a buffer used to communicate between two devices or processes is fed with data at a lower speed than the data is being read from it. Display engine buffer under-run may be detected by comparing the rate at which the display engine buffer is fed with data and the rate at which data is read from the display engine buffer. If the display engine buffer under-run is detected, the method 400 continues to operation 420. If not, the method 400 continues to operation 440.

At operation 420, upon determining that display engine buffer under-run of the DBUF 120 is detected, the computing machine adjusts the latency tolerance of the DBUF 120. In one example, the latency tolerance is adjusted by increasing the size of the DBUF 120. In one example, the latency tolerance is adjusted by incrementing a minimum level to maintain 205 of the DBUF 120, disabling one or more power management features of the computing machine, or disabling a priority control mechanism in the computing machine. The latency tolerance may be adjusted by a predetermined amount or percentage. After operation 420, the method 400 continues to operation 425.

At operation 425, the computing machine determines, once again, whether display engine buffer under-run of the DBUF 120 is detected. If so, the method 400 continues to operation 430. If not the method 400 continues to operation 440.

At operation 430, if display engine buffer under-run of the DBUF 120 is detected at operation 425, the computing machine determines whether the latency tolerance adjustment is less than a preset correction limit. The preset correction limit may correspond to a number of times (e.g. four times) that latency tolerance of the DBUF 120 is adjusted. Alternatively, the preset correction limit may correspond to an amount (e.g. 75%) by which the latency tolerance of the DBUF 120 is adjusted from an initial value (set at operation 410) of the latency tolerance of the DBUF. If the latency tolerance adjustment is less than the preset correction limit, the method 400 returns to operation 420. If the latency tolerance adjustment is not less than the preset correction limit, the method 400 continues to operation 435.

At operation 435, upon determining that the latency tolerance adjustment is not less than the preset correction limit, the computing machine generates an error reporting and diagnostics message. The error reporting and diagnostics message may be provided to the user, so that the user may attempt to fix the error that caused the buffer under-run or may notify the manufacturer of the error.

At operation 440, which occurs after operation 435 or upon failing to detect display engine buffer under-run of the DBUF 120 ad operation 415 or operation 425, the computing machine continues functioning. At operation 445, the computing machine determines whether there is a display configuration ("config") change. If so, the method 400 returns to operation 410. If not, the method 400 returns to operation 415. At some point, at operation 450, the computing machine is powered off. After the computing machine is powered off, in some cases, the latency tolerance returns to its original value. Alternatively, the latency tolerance may remain at the new value. In some cases, the latency tolerance returns to its original value and the new value is stored such that, if buffer under-run is detected again, the latency tolerance may be reset to the new value.

As described in conjunction with FIG. 4, the latency tolerance for the display buffer is initially set during the booting process of the computing machine. However, at the occurrence of display engine under-run during the runtime of the computing machine, the latency tolerance is adjusted. For example, the minimum level to maintain 205 is incremented or the priority is increased in another way. The history of prior correction(s) is stored in memory through the correction iteration count. If the threshold of correction iterations is not met, the latency is further adjusted in subsequent operations and the computing machine checks if the under-run failure is eliminated in each iteration. Once the threshold of correction iterations is met, if the under-run still persists, an error reporting and diagnostic message is generated. This message may be used to initiate a system configuration check, fall back to an alternative system, or take other measures.

The programmable latency adjustment operations in the method 400 (e.g. increasing the minimum level to maintain 205) and the threshold of correction iterations allow flexibility in various implementations of the method. Some hardware implementations of the method 400 have low latency and high security, and rely on few resources. The method may also be implemented in software, for example, using a display microcontroller or a power controller running firmware code.

Figure 5:
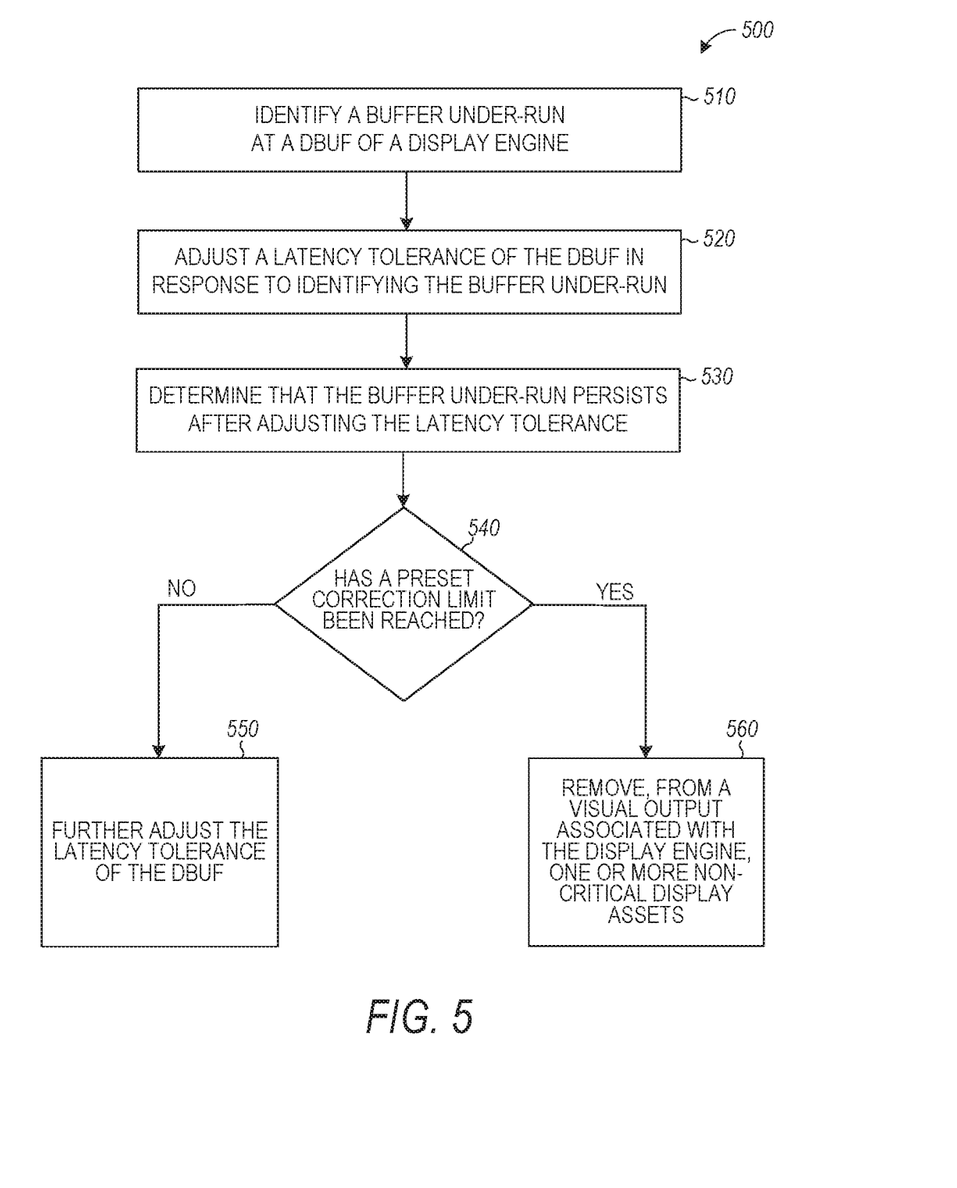
FIG. 5 illustrates a flowchart of a third method for identifying and responding to a buffer under-run, according to an example.

FIG. 5 illustrates a flowchart of a third method 500 for identifying and responding to a buffer under-run, according to an example.

At operation 510, a computing machine (e.g. which includes the system 100 of FIG. 1) identifies a buffer under-run at a DBUF of a display engine. Prior to operation 510, the computing machine may be booted and a latency tolerance of the DBUF may be set to an initial value during the booting of the computing machine. The initial value may be programmed into the computing machine, for example, by a manufacturer of the computing machine. Alternatively, the latency tolerance may correspond to a latency tolerance of the computing machine from immediately before it was powered off.

At operation 520, the computing machine adjusts the latency tolerance of the DBUF in response to identifying the buffer under-run. Techniques for adjusting the latency tolerance are described in conjunction with the operation 420 of FIG. 4.

At operation 530, the computing machine determines that the buffer under-run at the DBUF persists after adjusting the latency tolerance.

At operation 540, the computing machine determines whether a preset correction limit has been reached. The preset correction limit may correspond to a number of adjustments of the latency tolerance (e.g. six adjustments) or an amount by which the latency tolerance is adjusted (e.g. by 90% from its initial value, so that if the latency tolerance was initially 100 ms, it may be adjusted up to 190 ms). In some cases, the computing machine determines whether the preset correction limit has been reached by comparing a counter, stored in memory, with the preset correction limit. If the counter is greater than or equal to the preset correction limit, the computing machine determines that the preset correction limit has been reached. If the counter is less than the preset correction limit, the computing machine determines that the preset correction limit has not been reached.

If the preset correction limit has not been reached, the method 500 continues to operation 550. If the preset correction limit has not been reached, the method 500 continues to operation 560, At operation 550, if the preset correction limit has not been reached, the computing machine further adjusts the latency tolerance of the DBUF. After operation 550, the method 500 ends.

At operation 560, if the preset correction limit has been reached, the computing machine removes, from a visual output associated with the display engine, one or more non-critical display assets. The computing machine may also generate an error reporting and diagnostics message (e.g. for output or display to the user). A configuration check of the computing machine may be initiated in response to the error reporting and diagnostics message. In some cases, after disabling the non-critical display assets the computing machine checks for under-run, as described in conjunction with FIG. 4. The error reporting/diagnostic message that is generated during the flow may inform the user regarding the error and encourage the user to maintain caution before taking further follow on measures (e.g. diagnostics, repairs, manufacturer replacement, or the like). Having the error reported again after the configuration change/from fallback/alternate system/diagnostic may indicate the existence of a catastrophic error to user. After operation 560, the method 500 ends.

In some examples, a visual output associated with the display engine is provided for display at the display panel. The visual output may include one or more non-critical display assets and one or more critical display assets. The one or more critical display assets may include one or more of: vehicle camera data, vehicle sensor data, vehicle speed data, vehicle geolocation data, vehicle-to-vehicle communication data, and vehicle-to-infrastructure communication data. The one or more non-critical display assets may include one or more of: display features, control items, and infotainment icons, functions or features. A list of critical and non-critical display assets may be programmed into the computing machine by its manufacturer, its developer, or a user. Critical display assets are important to the functioning of the machine (e.g., camera and vehicle-to-vehicle communication data in a motor vehicle), whereas non-critical display assets add value to the functioning of the machine but are not mission critical (e.g., an infotainment system or passenger entertainment system in a motor vehicle).

Figure 6:
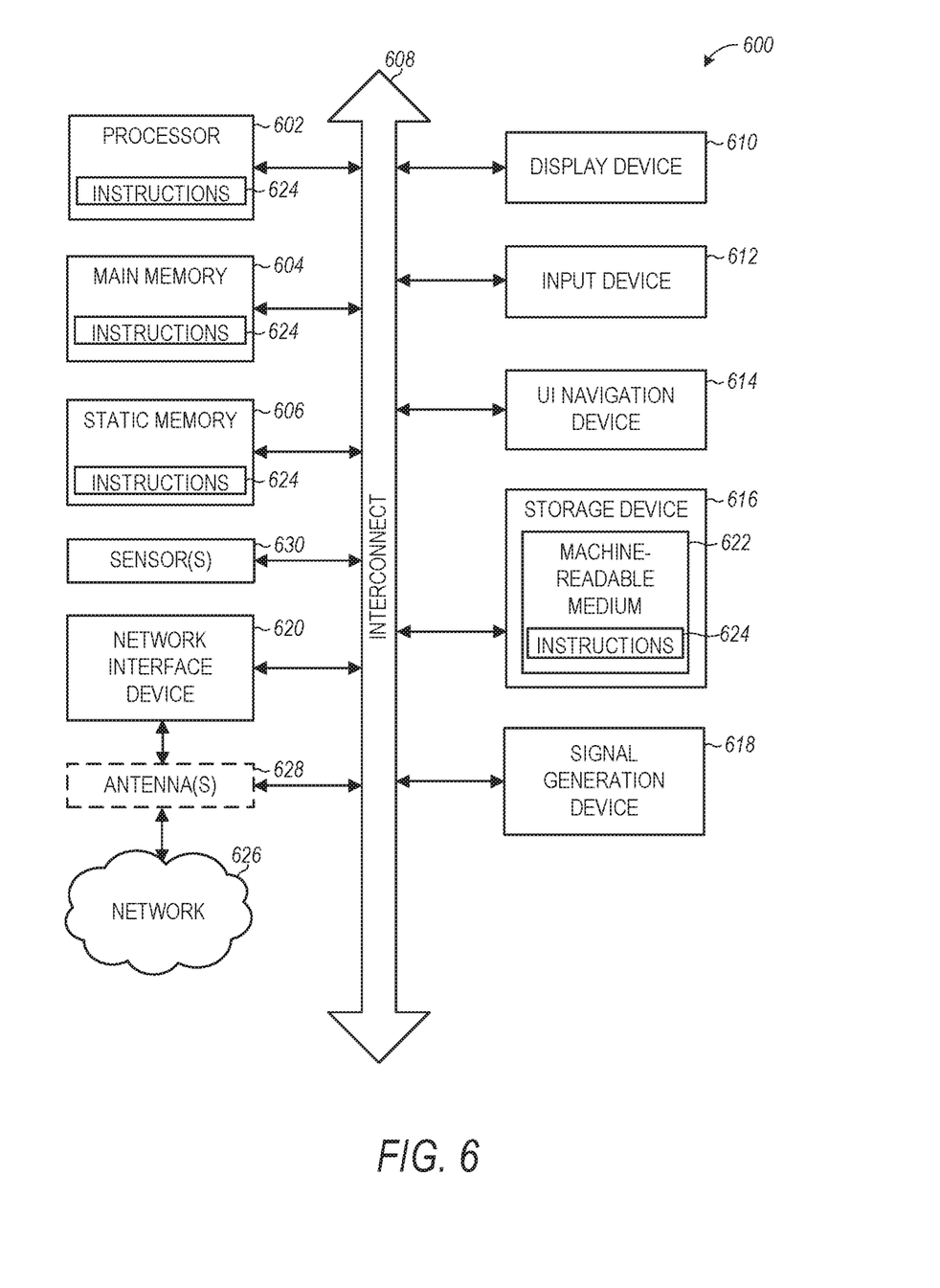
FIG. 6 illustrates a block diagram for an example computer system architecture upon which any one or more of the techniques (e.g., operations, processes, methods, and methodologies) discussed herein may be performed, according to an example.

FIG. 6 is a block diagram illustrating a machine in the example form of a computing system (e.g., computing device) 600, within which a set or sequence of instructions may be executed to cause the machine to perform any one of the methodologies discussed herein, according to an example embodiment. The machine may be a personal computer (PC), a tablet PC, a hybrid tablet/notebook PC, a personal digital assistant (PDA), a mobile telephone or smartphone, a wearable computer, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via an interconnect 608 (e.g., a link, a bus, etc.). The processor(s) 602 of the computer system 600 are hardware processors and may correspond to processing hardware of the machine. One or more processors 602 may correspond to a hardware processor array. The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), an output controller 632, a network interface device 620 (which may include or operably communicate with one or more antennas 628, transceivers, or other wireless communications hardware), and one or more sensors 630, such as a global positioning system (GPS) sensor, compass, accelerometer, location sensor, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 via an antenna 628 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone service (POTS) networks, and wireless data networks (e.g., 2G/3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Embodiments used to facilitate and perform the techniques described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices. Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a system for implementing fault-tolerant graphics, the system comprising: processing hardware of a machine; and a memory device storing instructions which, when executed by the processing hardware, cause the processing hardware to: identify, at the processing hardware, a buffer under-run at a data buffer (DBUF) of a display engine; adjust a latency tolerance of the DBUF in response to identifying the buffer under-run; determine that the buffer under-run at the DBUF persists after adjusting the latency tolerance; determine whether a preset correction limit has been reached; if the preset correction limit has not been reached: further adjust the latency tolerance of the DBUF; and if the preset correction limit has been reached: remove, from a visual output associated with the display engine, a non-critical display asset.

In Example 2, the subject matter of Example 1 includes, the memory device further storing instructions which, when executed by the processing hardware, cause the processing hardware to: boot the machine, wherein the latency tolerance of the DBUF is set to an initial value during booting the machine.

In Example 3, the subject matter of Examples 1-2 includes, the memory device further storing instructions which, when executed by the processing hardware, cause the processing hardware to: if the preset correction limit has been reached: generate an error reporting and diagnostics message.

In Example 4, the subject matter of Examples 1-3 includes, wherein the instructions to adjust the latency tolerance of the DBUF comprise instructions to increase a size of the DBUF.

In Example 5, the subject matter of Examples 1-4 includes, wherein the instructions to adjust the latency tolerance of the DBUF comprise instructions to increment a minimum level to maintain of the DBUF.

In Example 6, the subject matter of Examples 1-5 includes, wherein the preset correction limit corresponds to a number of times the latency tolerance of the DBUF is adjusted.

In Example 7, the subject matter of Examples 1-6 includes, wherein the preset correction limit corresponds to an amount by which the latency tolerance of the DBUF is adjusted from an initial value of the latency tolerance of the DBUF.

In Example 8, the subject matter of Examples 1-7 includes, wherein the non-critical display asset comprises one or more of: display features, control items, and infotainment icons, functions or features.

In Example 9, the subject matter of Examples 1-8 includes, the memory device further storing instructions which, when executed by the processing hardware, cause the processing hardware to: provide the visual output associated with the display engine for display at a display panel.

In Example 10, the subject matter of Example 9 includes, wherein the visual output comprises the non-critical display asset and a critical display asset.

In Example 11, the subject matter of Example 10 includes, wherein the critical display asset comprises one or more of vehicle camera data, vehicle sensor data, vehicle speed data, vehicle geolocation data, vehicle-to-vehicle communication data, and vehicle-to-infrastructure communication data.

In Example 12, the subject matter of Examples 1-11 includes, the memory device further storing instructions which, when executed by the processing hardware, cause the processing hardware to: cause transmission, to the DBUF and from a frame buffer, of visual data for display; store the visual data at the DBUF; and cause transmission, from the DBUF to a display panel or an intermediate buffer coupled with processing hardware of the display panel, of the visual data for display at the display panel.

In Example 13, the subject matter of Example 12 includes, wherein the frame buffer is stored in the memory device.

In Example 14, the subject matter of Examples 12-13 includes, wherein the frame buffer is stored in a remote memory, external to the machine.

In Example 15, the subject matter of Examples 12-14 includes, the memory device further storing instructions which, when executed by the processing hardware, cause the processing hardware to: remove the visual data from the DBUF in response to transmission of the visual data to the display panel.

In Example 16, the subject matter of Examples 1-15 includes, the display engine; and the DBUF residing within the display engine.

Example 17 is a display engine for implementing fault-tolerant graphics, the display engine comprising: a data buffer (DBUF) stored in a memory device; and a display engine processor to: identify a buffer under-run at the DBUF; adjust a latency tolerance of the DBUF in response to identifying the buffer under-run; determine that the buffer under-run at the DBUF persists after adjusting the latency tolerance; determine whether a preset correction limit has been reached; if the preset correction limit has not been reached: further adjust the latency tolerance of the DBUF; and if the preset correction limit has been reached: remove, from a visual output associated with the display engine, a non-critical display asset.

In Example 18, the subject matter of Example 17 includes, wherein the display engine processor is further to: cause transmission of the visual output to a display panel.

In Example 19, the subject matter of Examples 17-18 includes, wherein the display engine processor is further to: boot a machine hosting the display engine, wherein the latency tolerance of the DBUF is set to an initial value during booting the machine.

In Example 20, the subject matter of Examples 17-19 includes, wherein the display engine processor is further to: if the preset correction limit has been reached: generate an error reporting and diagnostics message.

In Example 21, the subject matter of Examples 17-20 includes, wherein the display engine processor, to adjust the latency tolerance of the DBUF, is to increase a size of the DBUF.

In Example 22, the subject matter of Examples 17-21 includes, wherein the display engine processor, to adjust the latency tolerance of the DBUF, is to increment a minimum level to maintain of the DBUF.

In Example 23, the subject matter of Examples 17-22 includes, wherein the preset correction limit corresponds to a number of times the latency tolerance of the DBUF is adjusted.

In Example 24, the subject matter of Examples 17-23 includes, wherein the preset correction limit corresponds to an amount by which the latency tolerance of the DBUF is adjusted from an initial value of the latency tolerance of the DBUF.

In Example 25, the subject matter of Examples 17-24 includes, wherein the non-critical display asset comprises one or more of: display features, control items, and infotainment icons, functions or features.

In Example 26, the subject matter of Examples 17-25 includes, the memory device further storing instructions which, when executed by the processing hardware, cause the processing hardware to: provide the visual output associated with the display engine for display at a display panel.

In Example 27, the subject matter of Example 26 includes, wherein the visual output comprises the non-critical display asset and a critical display asset.

In Example 28, the subject matter of Example 27 includes, wherein the critical display asset comprises one or more of: vehicle camera data, vehicle sensor data, vehicle speed data, vehicle geolocation data, vehicle-to-vehicle communication data, and vehicle-to-infrastructure communication data.

In Example 29, the subject matter of Examples 17-28 includes, the display engine processor further to: cause transmission, to the DBUF and from a frame buffer, of visual data for display; store the visual data at the DBUF; and cause transmission, from the DBUF to a display panel or an intermediate buffer coupled with processing hardware of the display panel, of the visual data for display at the display panel.

In Example 30, the subject matter of Example 29 includes, wherein the frame buffer is stored in the memory device.

In Example 31, the subject matter of Examples 29-30 includes, wherein the frame buffer is stored in a remote memory, external to a machine hosting the display engine.

In Example 32, the subject matter of Examples 29-31 includes, the display engine processor further to: remove the visual data from the DBUF in response to transmission of the visual data to the display panel.

Example 33 is a machine-readable medium storing instructions for implementing fault-tolerant graphics which, when executed by processing hardware of a machine, cause the processing hardware to: identify, at the processing hardware, a buffer under-run at a data buffer (DBUF) of a display engine; adjust a latency tolerance of the DBUF in response to identifying the buffer under-run; determine that the buffer under-run at the DBUF persists after adjusting the latency tolerance; determine whether a preset correction limit has been reached; if the preset correction limit has not been reached: further adjust the latency tolerance of the DBUF; and if the preset correction limit has been reached: remove, from a visual output associated with the display engine, a non-critical display asset.

In Example 34, the subject matter of Example 33 includes, storing instructions which, when executed by the processing hardware, cause the processing hardware to: boot the machine, wherein the latency tolerance of the DBUF is set to an initial value during booting the machine.

In Example 35, the subject matter of Examples 33-34 includes, storing instructions which, when executed by the processing hardware, cause the processing hardware to: if the preset correction limit has been reached: generate an error reporting and diagnostics message.

In Example 36, the subject matter of Examples 33-35 includes, wherein the instructions to adjust the latency tolerance of the DBUF comprise instructions to increase a size of the DBUF.

In Example 37, the subject matter of Examples 33-36 includes, wherein the instructions to adjust the latency tolerance of the DBUF comprise instructions to increment a minimum level to maintain of the DBUF.

In Example 38, the subject matter of Examples 33-37 includes, wherein the preset correction limit corresponds to a number of times the latency tolerance of the DBUF is adjusted.

In Example 39, the subject matter of Examples 33-38 includes, wherein the preset correction limit corresponds to an amount by which the latency tolerance of the DBUF is adjusted from an initial value of the latency tolerance of the DBUF.

In Example 40, the subject matter of Examples 33-39 includes, wherein the non-critical display asset comprises one or more of: display features, control items, and infotainment icons, functions or features.

In Example 41, the subject matter of Examples 33-40 includes, storing instructions which, when executed by the processing hardware, cause the processing hardware to: provide the visual output associated with the display engine for display at a display panel.

In Example 42, the subject matter of Example 41 includes, wherein the visual output comprises the non-critical display asset and a critical display asset.

In Example 43, the subject matter of Example 42 includes, wherein the critical display asset comprises one or more of vehicle camera data, vehicle sensor data, vehicle speed data, vehicle geolocation data, vehicle-to-vehicle communication data, and vehicle-to-infrastructure communication data.

In Example 44, the subject matter of Examples 33-43 includes, storing instructions which, when executed by the processing hardware, cause the processing hardware to: cause transmission, to the DBUF and from a frame buffer, of visual data for display; store the visual data at the DBUF; and cause transmission, from the DBUF to a display panel or an intermediate buffer coupled with processing hardware of the display panel, of the visual data for display at the display panel.

In Example 45, the subject matter of Example 44 includes, wherein the frame buffer is stored in the memory device.

In Example 46, the subject matter of Examples 44-45 includes, wherein the frame buffer is stored in a remote memory, external to the machine.

In Example 47, the subject matter of Examples 44-46 includes, storing instructions which, when executed by the processing hardware, cause the processing hardware to: remove the visual data from the DBUF in response to transmission of the visual data to the display panel.

Example 48 is a method for implementing fault-tolerant graphics, the method comprising: identifying, at a machine, a buffer under-run at a data buffer (DBUF) of a display engine; adjusting a latency tolerance of the DBUF in response to identifying the buffer under-run; determining that the buffer under-run at the DBUF persists after adjusting the latency tolerance; determining whether a preset correction limit has been reached; if the preset correction limit has not been reached: further adjusting the latency tolerance of the DBUF; and if the preset correction limit has been reached: removing, from a visual output associated with the display engine, a non-critical display asset.

In Example 49, the subject matter of Example 48 includes, booting the machine, wherein the latency tolerance of the DBUF is set to an initial value during booting the machine.

In Example 50, the subject matter of Examples 48-49 includes, if the preset correction limit has been reached: generating an error reporting and diagnostics message.

In Example 51, the subject matter of Examples 48-50 includes, wherein adjusting the latency tolerance of the DBUF comprises increasing a size of the DBUF.

In Example 52, the subject matter of Examples 48-51 includes, wherein adjusting the latency tolerance of the DBUF comprises incrementing a minimum level to maintain of the DBUF.

In Example 53, the subject matter of Examples 48-52 includes, wherein the preset correction limit corresponds to a number of times the latency tolerance of the DBUF is adjusted.

In Example 54, the subject matter of Examples 48-53 includes, wherein the preset correction limit corresponds to an amount by which the latency tolerance of the DBUF is adjusted from an initial value of the latency tolerance of the DBUF.

In Example 55, the subject matter of Examples 48-54 includes, wherein the non-critical display asset comprises one or more of: display features, control items, and infotainment icons, functions or features.

In Example 56, the subject matter of Examples 48-55 includes, providing the visual output associated with the display engine for display at a display panel.

In Example 57, the subject matter of Example 56 includes, wherein the visual output comprises the non-critical display asset and a critical display asset.

In Example 58, the subject matter of Example 57 includes, wherein the critical display asset comprises one or more of: vehicle camera data, vehicle sensor data, vehicle speed data, vehicle geolocation data, vehicle-to-vehicle communication data, and vehicle-to-infrastructure communication data.

In Example 59, the subject matter of Examples 48-58 includes, causing transmission, to the DBUF and from a frame buffer, of visual data for display; storing the visual data at the DBUF; and causing transmission, from the DBUF to a display panel or an intermediate buffer coupled with processing hardware of the display panel, of the visual data for display at the display panel.

In Example 60, the subject matter of Example 59 includes, wherein the frame buffer is stored in the memory device.

In Example 61, the subject matter of Examples 59-60 includes, wherein the frame buffer is stored in a remote memory, external to the machine.

In Example 62, the subject matter of Examples 59-61 includes, removing the visual data from the DBUF in response to transmission of the visual data to the display panel.

Example 63 is a system comprising: processing hardware of a machine; and a memory device storing instructions which, when executed by the processing hardware, cause the processing hardware to perform the method of any of Examples 48-62.

Example 64 is a machine-readable medium storing instructions which, when executed by processing hardware of a machine, cause the processing hardware to perform the method of any of Examples 48-62.

Example 65 is an apparatus for implementing fault-tolerant graphics, the apparatus comprising: means for identifying, at a machine, a buffer under-run at a data buffer (DBUF) of a display engine; means for adjusting a latency tolerance of the DBUF in response to identifying the buffer under-run; means for determining that the buffer under-run at the DBUF persists after adjusting the latency tolerance; means for determining whether a preset correction limit has been reached; if the preset correction limit has not been reached: means for further adjusting the latency tolerance of the DBUF; and if the preset correction limit has been reached: means for removing, from a visual output associated with the display engine, a non-critical display asset.

In Example 66, the subject matter of Example 65 includes, means for booting the machine, wherein the latency tolerance of the DBUF is set to an initial value during booting the machine.

In Example 67, the subject matter of Examples 65-66 includes, if the preset correction limit has been reached: means for generating an error reporting and diagnostics message.

In Example 68, the subject matter of Examples 65-67 includes, wherein the means for adjusting the latency tolerance of the DBUF comprises means for increasing a size of the DBUF.

In Example 69, the subject matter of Examples 65-68 includes, wherein the means for adjusting the latency tolerance of the DBUF comprises means for incrementing a minimum level to maintain of the DBUF.

In Example 70, the subject matter of Examples 65-69 includes, wherein the preset correction limit corresponds to a number of times the latency tolerance of the DBUF is adjusted.

In Example 71, the subject matter of Examples 65-70 includes, wherein the preset correction limit corresponds to an amount by which the latency tolerance of the DBUF is adjusted from an initial value of the latency tolerance of the DBUF.

In Example 72, the subject matter of Examples 65-71 includes, wherein the non-critical display asset comprises one or more of: display features, control items, and infotainment icons, functions or features.

In Example 73, the subject matter of Examples 65-72 includes, means for providing the visual output associated with the display engine for display at a display panel.

In Example 74, the subject matter of Example 73 includes, wherein the visual output comprises the non-critical display asset and a critical display asset.

In Example 75, the subject matter of Example 74 includes, wherein the critical display asset comprises one or more of: vehicle camera data, vehicle sensor data, vehicle speed data, vehicle geolocation data, vehicle-to-vehicle communication data, and vehicle-to-infrastructure communication data.

In Example 76, the subject matter of Examples 65-75 includes, means for causing transmission, to the DBUF and from a frame buffer, of visual data for display; means for storing the visual data at the DBUF; and means for causing transmission, from the DBUF to a display panel or an intermediate buffer coupled with processing hardware of the display panel, of the visual data for display at the display panel.

In Example 77, the subject matter of Example 76 includes, wherein the frame buffer is stored in the memory device.

In Example 78, the subject matter of Examples 76-77 includes, wherein the frame buffer is stored in a remote memory, external to the machine.

In Example 79, the subject matter of Examples 76-78 includes, means for removing the visual data from the DBUF in response to transmission of the visual data to the display panel.

Example 80 is at least one machine-readable medium including instructions that, when executed by processing circuitry, cause the processing circuitry to perform operations to implement of any of Examples 1-79.

Example 81 is an apparatus comprising means to implement of any of Examples 1-79.

Example 82 is a system to implement of any of Examples 1-79.

Example 83 is a method to implement of any of Examples 1-79.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A display engine for implementing fault-tolerant graphics, the display engine comprising:
    a data buffer (DBUF) stored in a memory device; and
    a display engine processor to:
        identify a buffer under-run at the DBUF;
        adjust a latency tolerance of the DBUF in response to identifying he buffer under-run;
        determine that the buffer under-run at the DBUF persists after adjusting the latency tolerance;
        determine whether a preset correction limit has been reached;
        if the preset correction limit has not been reached: further adjust the latency tolerance of the DBUF; and
        if the preset correction limit has been reached: remove, from a visual output associated with the display engine, a non-critical display asset, wherein the non-critical display asset is determined not to be mission critical to a function of a machine hosting the display engine.

2. The display engine of claim 1, wherein the display engine processor is further to:
    cause transmission of the visual output to a display panel.

3. The display engine of claim 1, wherein the display engine processor is further to:
    boot the machine hosting the display engine, wherein the latency tolerance of the DBUF is set to an initial value during booting the machine.

4. The display engine of claim 1, wherein the display engine processor is further to:
    if the preset correction limit has been reached: generate an error reporting and diagnostics message.

5. The display engine of claim 1, wherein the display engine processor, to adjust the latency tolerance of the DBUF, is to increase a size of the DBUF.

6. The display engine of claim 1, wherein the display engine processor, to adjust the latency tolerance of the DBUF, is to increment a minimum level to maintain of the DBUF.

7. The display engine of claim 1, wherein the preset correction limit corresponds to a number of times the latency tolerance of the DBUF is adjusted.

8. The display engine of claim 1, wherein the preset correction limit corresponds to an amount by which the latency tolerance of the DBUF is adjusted from an initial value of the latency tolerance of the DBUF.

9. The display engine of claim 1, wherein the non-critical display asset comprises one or more of: control items and infotainment icons.

10. The display engine of claim 1, wherein the display engine processor is further to:
    provide the visual output associated with the display engine for display at a display panel.

11. The display engine of claim 10, wherein he visual output comprises the non-critical display asset and a critical display asset.

12. The display engine of claim 11, wherein the critical display asset comprises one or more of: vehicle camera data, vehicle sensor data, vehicle speed data, vehicle geolocation data, vehicle-to-vehicle communication data, and vehicle-to-infrastructure communication data.

13. The display engine of claim 1, the display engine processor further to:
    cause transmission, to the DBUF and from a frame buffer, of visual data for display;
    store the visual data at the DBUF; and
    cause transmission, from the DBUF to a display panel or an intermediate buffer coupled with processing hardware of the display panel, of the visual data for display at the display panel.

14. The display engine of claim 13, wherein the frame buffer is stored in the memory device.

15. The display engine of claim 13, wherein the frame buffer is stored in a remote memory, external to the machine hosting the display engine.

16. The display engine of claim 13, the display engine processor further to:
    remove the visual data from the DBUF in response to transmission of the visual data to the display panel.

17. A system for implementing fault-tolerant graphics, the system comprising:
    processing hardware of a machine; and
    a memory device storing instructions which, when executed by the processing hardware, cause the processing hardware to:
        identify, at the processing hardware, a buffer under-run at a data buffer (DBUF) of a display engine;

adjust a latency tolerance of the DBUF in response to identifying the buffer under-run;

determine that the buffer under-run at the DBUF persists after adjusting the latency tolerance;

determine whether a preset correction limit has been reached;

if the preset correction limit has not been reached: further adjust the latency tolerance of the DBUF; and if the preset correction limit has been reached: remove, from a visual output associated with the display engine, a non-critical display asset, wherein the non-critical display asset is determined not to be mission critical to a function of the machine.

18. The system of claim 17, the memory device further storing instructions which, when executed by the processing hardware, cause the processing hardware to:

boot the machine, wherein the latency tolerance of the DBUF is set to an initial value during booting the machine.

19. The system of claim 17, the memory device further storing instructions which, when executed by the processing hardware, cause the processing hardware to:

if the preset correction limit has been reached: generate an error reporting and diagnostics message.

20. A non-transitory machine-readable medium storing instructions for implementing fault-tolerant graphics which, when executed by processing hardware of a machine, cause the processing hardware to:

identify, at the processing hardware, a buffer under-run at a data buffer (DBUF) of a display engine;

adjust a latency tolerance of the DBUF in response to identifying the buffer under-run;

determine that the buffer under-run at the DBUF persists after adjusting the latency tolerance;

determine whether a preset correction limit has been reached;

if the preset correction limit has not been reached: further adjust the latency tolerance of the DBUF; and if the preset correction limit has been reached: remove, from a visual output associated with the display engine, a non-critical display asset, wherein the non-critical display asset is determined not to be mission critical to a function of the machine.

21. The machine-readable medium of claim 20, further comprising instructions which, when executed by the processing hardware of the machine, cause the processing hardware to:

boot the machine, wherein the latency tolerance of the DBUF is set to an initial value during booting the machine.

22. The machine-readable medium of claim 20, further comprising instructions which, when executed by the processing hardware of the machine, cause the processing hardware to:

if the preset correction limit has been reached: generate an error reporting and diagnostics message.

23. A method for implementing fault-tolerant graphics, the method comprising:

identifying, at a machine, a buffer under-run at a data buffer (DBUF) of a display engine;

adjusting a latency tolerance of the DBUF in response to identifying the buffer under-run;

determining that the buffer under-run at the DBUF persists after adjusting the latency tolerance;

determining whether a preset correction limit has been reached;

if the preset correction limit has not been reached: further adjusting the latency tolerance of the DBUF; and if the preset correction limit has been reached: removing, from a visual output associated with the display engine, a non-critical display asset, wherein the non-critical display asset is determined not to be mission critical to a function of the machine.

24. The method of claim 23, further comprising:

booting the machine, wherein the latency tolerance of the DBUF is set to an initial value during booting the machine.

25. The method of claim 23, further comprising:

if the preset correction limit has been reached: generating an error reporting and diagnostics message.

* * * * *

UNITED STATES PATENT AND TRADEMARK OFFICE
CERTIFICATE OF CORRECTION

PATENT NO. : 10,387,993 B2  
APPLICATION NO. : 15/721273  
DATED : August 20, 2019  
INVENTOR(S) : Chaudhari et al.

Page 1 of 1

It is certified that error appears in the above-identified patent and that said Letters Patent is hereby corrected as shown below:

In the Claims

Column 15, Line 55, Claim 1, delete "he" and insert --the-- therefor

Column 16, Line 34, Claim 11, delete "he" and insert --the-- therefor

Signed and Sealed this  
Third Day of March, 2020

Andrei Iancu  
*Director of the United States Patent and Trademark Office*